United States Patent [19]

Hollis et al.

[11] 4,300,774

[45] Nov. 17, 1981

[54] REMOVABLE SEALING PLUG FOR SPACED APART WALL STRUCTURE

[75] Inventors: Nicholas E. Hollis, Springdale; Michael P. Swift, Milford; Herbert Halila, Cincinnati, all of Ohio

[73] Assignee: General Electric Company, Cincinnati, Ohio

[21] Appl. No.: 144,135

[22] Filed: Apr. 28, 1980

[51] Int. Cl.³ .................. F16J 15/06; B25G 3/02
[52] U.S. Cl. .................................. 277/12; 277/61; 60/39.75; 403/20; 403/327; 403/350; 403/361
[58] Field of Search .................. 411/87, 102, 114; 403/19, 20, 327, 350, 361; 60/39.75; 277/61, 62, 12

[56] References Cited

U.S. PATENT DOCUMENTS

| | | | |
|---|---|---|---|
| 1,507,362 | 9/1924 | Bartosik | |
| 2,947,209 | 8/1960 | Kosta | |
| 3,337,245 | 8/1967 | Prange | 403/327 |
| 3,362,160 | 1/1968 | Bourgeois | 60/39.75 |
| 3,718,213 | 2/1973 | Hegar et al. | 403/361 X |
| 3,864,211 | 2/1975 | King et al. | 403/327 X |
| 4,098,555 | 7/1978 | Vollenweider | 403/20 |

*Primary Examiner*—Robert S. Ward, Jr.
*Attorney, Agent, or Firm*—Carl L. Silverman; Derek P. Lawrence

[57] ABSTRACT

A plug including an axial shaft, a mating end of which is spring coupled to a mating portion of a sealing plug. The other end of the shaft includes an externally threaded portion and a flanged portion. The sealing plug also includes an externally threaded portion and a flanged portion. The spring normally mates the shaft and sealing plug together so that the members are rotationally engaged. When the spring is suitably compressed, the mating relationship is removed so that the members are rotationally disengaged. The plug is particularly useful in conveniently sealing double wall combustors such as those in gas turbine engines.

12 Claims, 2 Drawing Figures

REMOVABLE SEALING PLUG FOR SPACED APART WALL STRUCTURE

BACKGROUND OF THE INVENTION

The present invention relates to aperture sealing means and, more particularly, to such sealing means for sealing opposing apertures in a structure of the type having spaced apart walls.

Structures of the type having spaced apart walls often include opposing apertures which require removable sealing means. For example, in the aircraft engine industry, many engines include double walled structures, such as compressors and combustors, wherein the outer and inner walls are respectively provided with opposing apertures. One purpose of such opposing apertures is to allow inspection and monitoring of the engine. This may be accomplished by inserting inspection equipment, such as borescopes and/or probes, through such apertures. An example of one such inspection apparatus can be found in U.S. Pat. No. 3,362,160 entitled, "Gas Turbine Engine Inspection Apparatus," issued to Bourgeois on Jan. 9, 1968, which patent is hereby incorporated by reference. For some inspection applications, after the act of inspection, the inspection equipment is no longer needed on the engine. Accordingly, after such inspection, the inspection equipment may be removed, requiring the inner and outer wall apertures to be sealed. Conventional sealing means for such applications present certain problems. For example, the outer and inner walls typically present little space for maneuvering and applying the necessary torque to the sealing means. This problem is especially significant with respect to the inner wall.

Accordingly, it is a general object of this invention to provide improved sealing means for double wall structures.

Another object of the present invention, is to provide such sealing means wherein all the necessary rotational torque can be conveniently applied.

SUMMARY OF THE INVENTION

In carrying out one form of our invention, we provide apparatus for removably sealing at least a pair of opposing apertures in a structure of the type having at least two spaced apart walls. Each of the walls includes at least one of the opposing apertures. First shaft means is provided and extends between the two spaced apart walls. The first shaft means includes a pair of axially opposing ends. One of the ends includes fastening and sealing means for removably fastening in a substantially sealed manner to the opposing aperture in one of the walls. The other of the ends includes first mating means for mating with a second sealing means. Rotationally torqueable second sealing means is provided and includes fastening and sealing means for removably fastening in a substantially sealed manner to the opposing aperture in the other wall. The second sealing means further includes second mating means for mating with the first mating means. Compressible spring means couples the first shaft means and the second sealing means for engaging the first and second mating means wherein the first and second mating means are normally urged together by the spring means and wherein the first shaft means and the second sealing means are rotationally engaged such that rotational torque applied to the second sealing means is transferred to the first sealing means. A predetermined compression of the spring means separates the first and second mating means such that the first shaft means and the second sealing means are rotationally disengaged.

BRIEF DESCRIPTION OF THE DRAWINGS

For a better understanding of the invention, reference may be had to the following description, taken in conjunction with the accompanying drawings, wherein.

DETAILED DESCRIPTION OF THE INVENTION

Figures 1, 2:
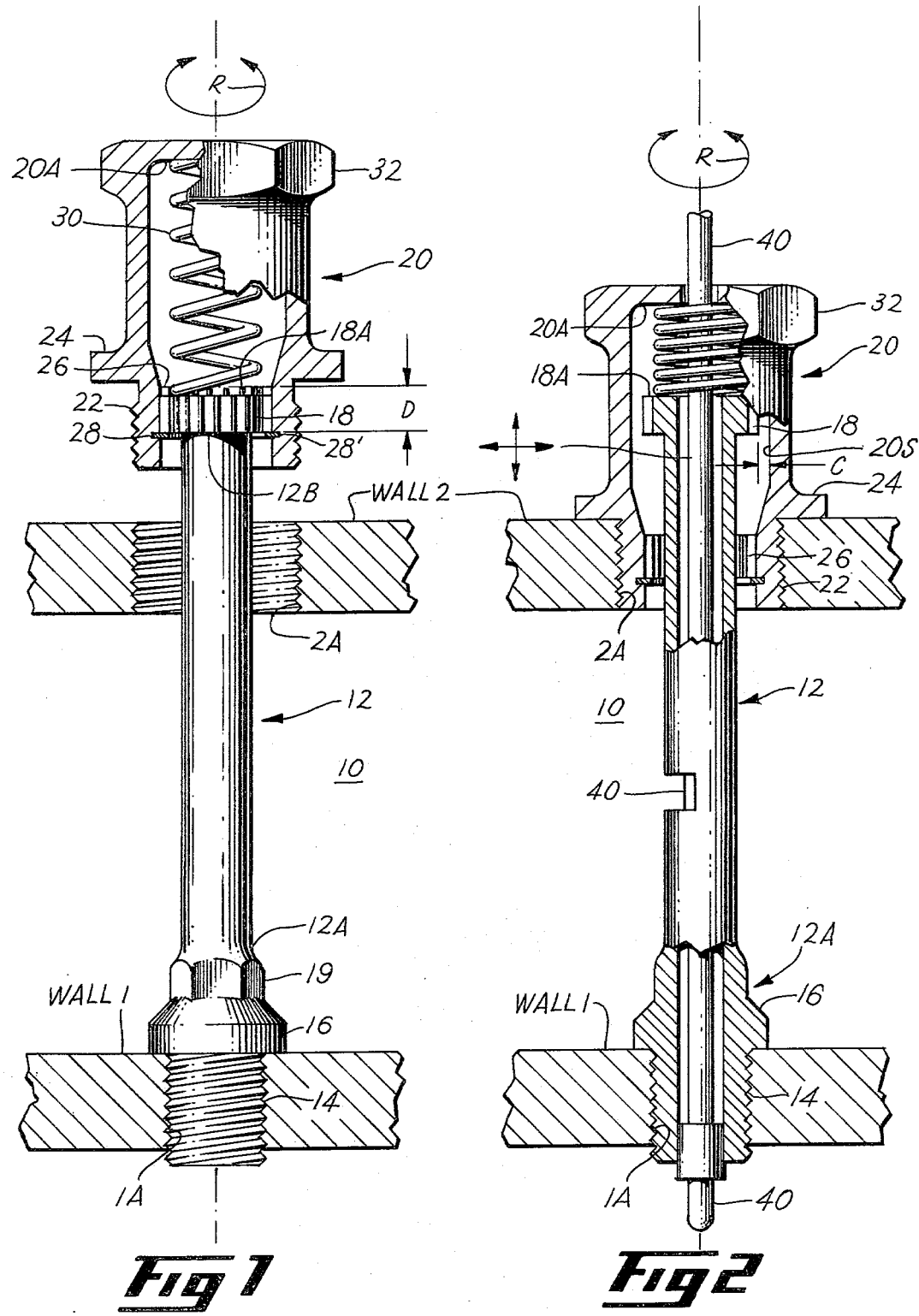
FIG. 1 is a partially sectioned elevational view showing one form of removable sealing means of the present invention.
FIG. 2 is a partially sectioned elevational view, taken as in FIG. 1, showing one form of operation of the removable sealing means of FIG. 1.

Referring initially to FIG. 1, one form of sealing means of the present invention is generally designated 10 and, may, for example, represent a borescope plug. The borescope plug 10 includes a first axial shaft 12 having a pair of opposing axial ends 12A and 12B. The end 12A of the shaft 21 includes fastening means 14 which may, for example, be in the form of conventional external threads. The end 12A also includes sealing means 16 which may, for example, be in the form of a flange, for sealing internally threaded aperture 1A in wall 1. For reasons which will be more fully understood later, the end 12A may also include a wrenching portion 19. The other end 12B of the shaft 12 includes a mating portion 18 which may, for example, comprise a hexagonally shaped structure.

Second sealing means 20 which may, for example, be in the form of a rotationally torqueable plug, is provided for mating with first shaft 12. Plug 20 includes fastening means 22, which may, for example, be in the form of conventional external threads for fastening to an internally threaded aperture 2A in wall 2. Plug 20 also includes sealing means 24, which may be in the form of a flange, for sealing to wall 2. Plug 20 includes mating means 26 for mating with mating means 18 of shaft 12. More particularly, mating means 26 may be in the form of an internally formed, i.e., female, hexagonal structure for mating with the corresponding externally formed, i.e., male, hexagonal mating means 18. For reasons which will be more fully understood later, the internal mating means 26 of plug 20 extends axially only for a distance D within the plug 20. Also, a clearance C is provided between the mating means 18 and the axial inner sidewall 20S of the plug 20 (see FIG. 2). A ring 28, preferably removable, is provided in groove 28' to restrain axial movement of mating means 18 completely out of plug 20.

Compressible spring means 30 is provided for coupling shaft mating means 18 with plug mating means 26. The compressible spring means 30 may be positioned between axially outer surface 18A of mating means 18 and axially inner surface 20A of plug 20. The normal position of the plug 20 is as shown in FIG. 1. More particularly, in the normal position, spring 30 urges shaft mating means 18 and plug mating means 26 together. In this position, the shaft 12 and plug 20 are rotationally engaged such that rotational torque applied to the plug 20 is transferred to the shaft 12.

Referring now to the operation of the borescope plug 10. Typically, beginning with the normal position of FIG. 1 for a sealing operation, rotational torque (see arrow R) is applied to the relatively large torqueable wrenching head 32 of the outer plug 20. The head 32 is sized so as to be capable of transferring the desired magnitude of rotational torque. This rotational torque is transferred to the shaft 12 and, hence, to the fastening means 14. The head 32 is continued to be torqued so as to sufficiently fasten and seal the aperture 1A in wall 1. When shaft 12 and flange 16 have sufficiently sealed the aperture 1A in wall 1, the spring 30 is then compressed, wherein mating means 18 and 26 are no longer mated and plug 20 and shaft 12 are rotationally disengaged. This position of rotational disengagement is shown in FIG. 2 wherein like reference numerals represent like elements of FIG. 1. Accordingly, at this position, head 32 of plug 20 can be further rotationally torqued until fastening meand 22 securely fastens and sealing means 24 appropriately seals the aperture 2A in wall 2, resulting in the relationship shown in FIG. 2.

It is to be appreciated that the borescope plug 10, when in the sealed position of FIG. 2, permits axial and transverse relative movement of the plug 20 and shaft 12 (see arrows). This relative movement is particularly desirable for applications involving environments characterized by thermal variations and/or mechanical deflections.

Removal of the plug 10 from the opposing apertures in the spaced apart walls 1 and 2 is simply accomplished by reversing the above procedures. More particularly, beginning with the position shown in FIG. 2, plug 20 is simply reverse rotated until the aperture 2A in the wall 2 is no longer sealed and the spring 30 is no longer compressed. At this point, the relationship shown in FIG. 1 is obtained such that the mating means 18 and 26 are again mated and further reverse rotation of head 32 of plug 20 will remove end 12A from its fastening and sealing relationship to aperture 1A in wall 1.

It is to be appreciated that, if desired, the borescope 10 of FIG. 1 could also serve as an inspection and/or monitoring device. In this connection, as partially shown in FIG. 2, the borescope plug 10 may actually include, or comprise, probe means 40 for observing properties, such as temperature and pressure, within the space defined between walls 1 and 2, as well as in the space beyond wall 1.

While the present invention has been described with reference to specific embodiments thereof, it will be obvious to those skilled in the art that various changes and modifications may be made without departing from the invention in its broader aspects. It is contemplated in the appended claims to cover all such variations and modifications of the invention which come within the true spirit and scope of our invention.

What is claimed as new and desired to be secured by Letters Patent of the United States is:

1. Apparatus for removably sealing at least a pair of opposing apertures in a structure of the type having at least two spaced apart walls wherein each of the walls includes at least one of the opposing apertures, which comprises:
    (a) first shaft means for extending between the two spaced apart walls and having a pair of axially opposing ends, one of said ends including fastening and sealing means for removably fastening in a substantially sealed manner to the opposing aperture in one of the walls, the other of said ends including first mating means for mating with a second sealing means;
    (b) rotationally torqueable second sealing means including fastening and sealing means for removably fastening in a substantially sealed manner to the opposing aperture in the other wall and further including second mating means for mating with said first mating means; and
    (c) compressible spring means coupling said first shaft means and said second sealing means for engaging said first and second mating means wherein:
        (i) said first and second mating means are normally urged together by said spring means and wherein said first shaft means and second sealing means are rotationally engaged such that rotational torque applied to said second sealing means is transferred to said first sealing means; and
        (ii) a predetermined compression of said spring means separates said first and second mating means such that said first shaft means and said second sealing means are rotationally disengaged.

2. Apparatus in accordance with claim 1 which comprises a borescope plug.

3. Apparatus in accordance with claim 2 in which said borescope plug includes probe means for observing properties within the space defined between the two spaced walls.

4. Apparatus in accordance with claim 2 in which said borescope plug includes probe means for observing properties in the space beyond the one wall and remote from the other wall.

5. Apparatus in accordance with claim 2 in which said second sealing means includes a rotationally torqueable plug and in which said fastening means of said second sealing means includes external threads.

6. Apparatus in accordance with claim 5 in which said sealing means of said second sealing means includes a flange.

7. Apparatus in accordance with claim 2 in which said fastening means of said first sealing means includes external threads.

8. Apparatus in accordance with claim 7 which said sealing means of said first sealing means includes a flange.

9. Apparatus in accordance with claim 2 in which said first mating means comprises a male member and said second mating means comprises a corresponding female member.

10. Apparatus in accordance with claim 8 in which said second mating means extends only partially axially into said second sealing means.

11. Apparatus in accordance with claim 2 in which the spaced apart walls comprise compressor walls in a gas turbine engine.

12. Apparatus in accordance with claim 2 in which the spaced apart walls comprise combustor walls in a gas turbine engine.

* * * * *